United States Patent
Tseng et al.

(10) Patent No.: US 8,802,327 B2
(45) Date of Patent: Aug. 12, 2014

(54) ELECTRODE STRUCTURE CAPABLE OF SEPARATE DELIVERING GAS AND FLUID AND PASSIVE FUEL CELL USING THE SAME

(75) Inventors: Fan Gang Tseng, Hsinchu (TW); Hsien Chih Peng, Hsinchu (TW); Po Hung Chen, Sanchong (TW)

(73) Assignee: National Tsing Hua University, Hsinchu (TW)

( * ) Notice: Subject to any disclaimer, the term of this patent is extended or adjusted under 35 U.S.C. 154(b) by 649 days.

(21) Appl. No.: 13/043,387

(22) Filed: Mar. 8, 2011

(65) Prior Publication Data
US 2011/0223503 A1 Sep. 15, 2011

(30) Foreign Application Priority Data
Mar. 9, 2010 (TW) .............................. 99106702 A

(51) Int. Cl.
*H01M 8/02* (2006.01)
(52) U.S. Cl.
USPC ............ 429/514; 429/512; 429/513; 429/456
(58) Field of Classification Search
USPC ................. 429/408–427, 428–451, 512–516, 429/523–534, 535, 456
See application file for complete search history.

(56) References Cited

U.S. PATENT DOCUMENTS
2007/0148526 A1* 6/2007 Farrington et al. ............. 429/38

OTHER PUBLICATIONS

Metz T, Paust N, Müller C, Zengerle R, and Koltay P "Passive water removal in fuel cells by capillary droplet actuation" Sensors & Actuators: A. Physical. 143 p. 49-57.
Alyousef Y. and Yao S. C. "Development of a silicon-based wettability controlled membrane for microscale direct methanol fuel cells" Microfluid Nanofluid 2 p. 337-344.

* cited by examiner

*Primary Examiner* — Basia Ridley
*Assistant Examiner* — Caitlin Wilmot
(74) *Attorney, Agent, or Firm* — Muncy, Geissler, Olds & Lowe, P.C.

(57) ABSTRACT

The present invention discloses an electrode structure capable of separately delivering gas and fluid which is applied to a passive fuel cell. The electrode structure includes an electrode portion and a water removal plate, and the electrode portion is adjacent to the water removal plate. The water removal plate includes a first surface, a second surface opposite to the first surface, a plurality of gas passages passing from the first surface to the second surface, and a plurality of liquid passages disposed on the first surface. The surfaces of the gas passages are treated with hydrophobic treatment, and the surfaces of the liquid passages are treated with hydrophilic treatment.

18 Claims, 12 Drawing Sheets

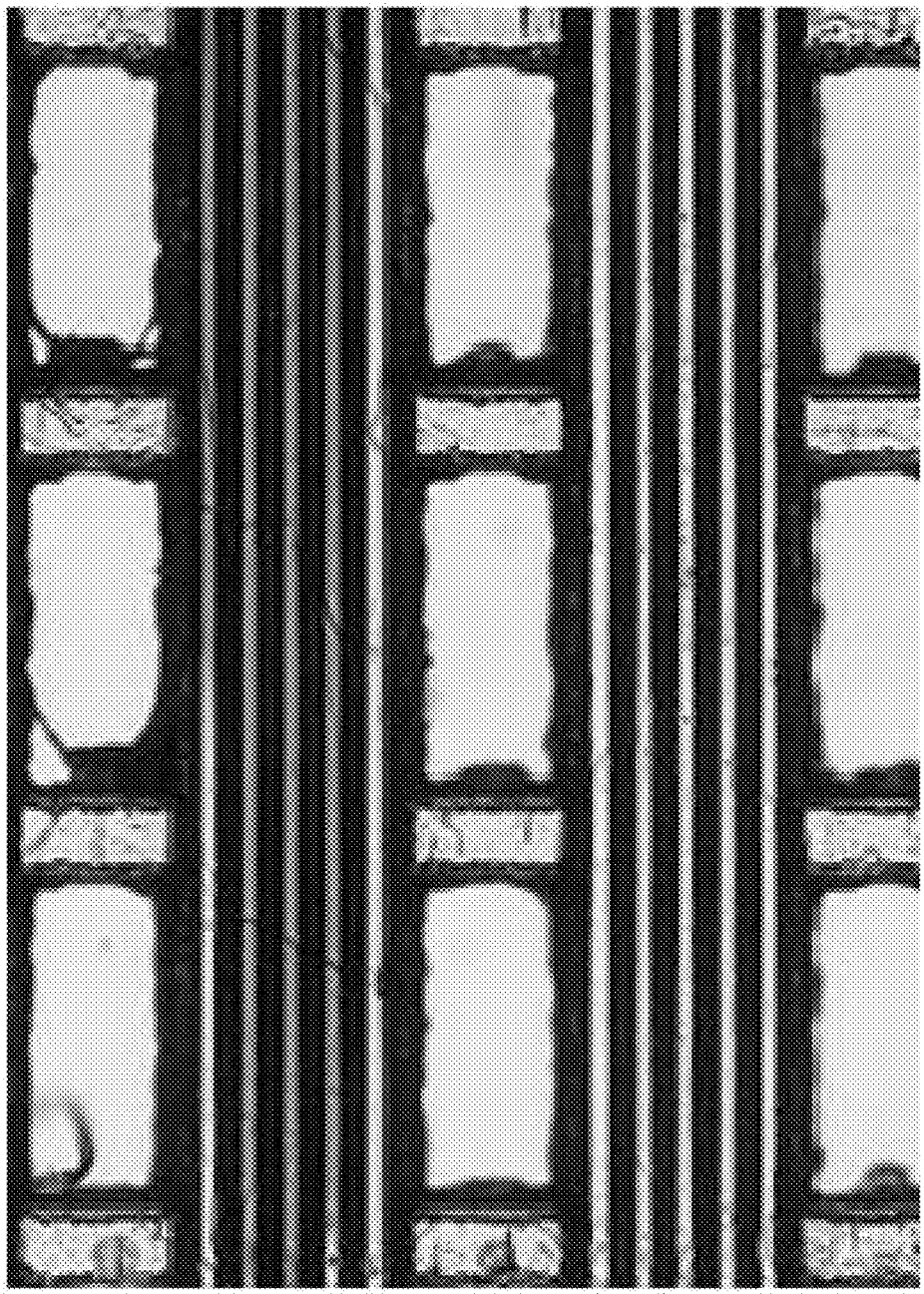
FIG. 5D  T+3/30 Second

ELECTRODE STRUCTURE CAPABLE OF SEPARATE DELIVERING GAS AND FLUID AND PASSIVE FUEL CELL USING THE SAME

1. TECHNICAL FIELD

The present invention relates to an electrode structure capable of separately delivering gas and fluid and a passive fuel cell using the same, and more particularly to an electrode structure capable of guiding a product to leave and guiding reactant gas to enter, and a passive fuel cell having the electrode structure.

2. BACKGROUND

Recently, various types of portable electronic devices, such as a notebook computer, a Personal Digital Assistant (PDA) and a mobile phone, all need a miniature power generation unit. Since the weight and use convenience of a conventional rechargeable cell are greatly limited, various replaceable power generation units are developed, in which the development of a fuel cell manufactured with a micro-electromechanical technology is the most rapid, and the fuel cell has advantages such as fast reaction rate, high heat dissipation efficiency and space saving.

The fuel cell enables hydrogen atoms in fuel to be dissociated with an electrochemical reaction, and simultaneously release electrons to generate current. Substances as hydrogen gas, methanol, natural gas or gasoline may be directly used as the fuel. FIG. 1 is a schematic structural view of a conventional Direct Methanol Fuel Cell (DMFC) 10. Diluted methanol is input into a passage of an anode 11, diffuses and penetrates a Gas Diffusion Layer (GDL) 121 of a porous structure, and when the methanol contacts a catalyst 131, the following chemical reaction is generated.

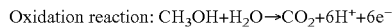

Oxidation reaction: $CH_3OH+H_2O \rightarrow CO_2+6H^++6e^-$

Electrons generated by the oxidation reaction are collected by the GDL 121, and supply power needed by a load 80 through an external line, and then the electrons are transferred to a GDL 122 at an end where a cathode 15 is located. Also, after the reaction, the product of carbon dioxide still exists, so the anode 11 still needs to emit the carbon dioxide to the atmosphere. A porous thin film 14 is located between the GDL 121 and the GDL 122, which separates the anode 11 from the cathode 15, and allows protons (H$^+$) to penetrate and reach the catalyst 132 to perform a reduction reaction, and the reduction reaction formula is as follows.

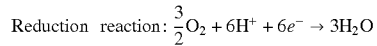

$$\text{Reduction reaction}: \frac{3}{2}O_2 + 6H^+ + 6e^- \rightarrow 3H_2O$$

Oxygen needed in the reduction reaction is supplied to the GDL 122 through the passage in the cathode 15, and meanwhile waste water generated by the reduction also needs to be drained to the outside. The total reaction of the oxidation reaction and the reduction reaction is as follows.

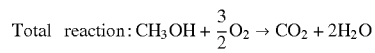

$$\text{Total reaction}: CH_3OH + \frac{3}{2}O_2 \rightarrow CO_2 + 2H_2O$$

However, the reduction reaction of the DMFC 10 at the cathode 15 generates water, while if the water is not treated in time, the water is accumulated in a reaction region of the cathode 15, so it is difficult for the oxygen needed by the reaction of the cathode 15 to enter, and thus the reduction reaction cannot be generated, thereby causing decrease of the cell power. Currently, many research teams are discussing to actively introduce reactant gas at the cathode, and use forced air flow to dry the water generated at the cathode, thereby solving the problem of the water accumulation, or remove the water in a capillary force manner.

Metz T et al. also propose a technology of removing water generated at a cathode in the capillary force manner in a document (Metz T, Paust N, Müller C, Zengerle R, and Koltay P "Passive water removal in fuel cells by capillary droplet actuation" *Sensors & Actuators: A. Physical.* 143 p. 49-57), in which one drainage passage is placed on a GDL of the cathode, the front end of the passage is designed to be tapered inward, and the distal end is one rectangular passage; the foregoing tapered design can suck the water from the outside to inside of the passage, then store the water in the rectangular passage, and finally transfer the water to two sides of the passage in a corner flow manner to allow a water absorption material to absorb. However, in the document, the technology of guiding oxygen into a reaction zone of the cathode is not disclosed, while since waste water cannot be quickly drained, the guiding the oxygen to enter may seriously affect the power generation performance.

Additionally, S. C. Yao et al. mention a manner of utilizing gravity in a document (Alyousef Y and Yao S C "Development of a silicon-based wettability controlled membrane for microscale direct methanol fuel cells" *Microfluid Nanofluid* 2 p. 337-344), in which water generated at a cathode flows downward under the effect of gravity, and then a micro-pump is utilized to enable the water to return to an anode to participate in a reaction. A porous array structure is adopted, and hydrophilic/hydrophobic treatment is performed periodically at a sidewall of a pore of this structure, so that gas/fluid can be selectively allowed to enter and leave pores treated with different surface treatment. After the fluid is generated from the reaction zone, the fluid can flow into a hydrophilic pore array and then leave the reaction zone, while a hydrophobic pore array always maintains dry to provide a path for oxygen diffusion. However, in the document, the drainage speed is not increased with the corner flow technology, the water can form fluid drops only through the hydrophilic pore array and then be concentrated in the gravity manner, and finally the micro-pump delivers the collected water back to the anode.

To sum up, in order to improve the fuel cell power, a cell electrode capable of quickly separating and delivering gas/fluid is needed, and therefore, the present invention particularly proposes an electrode structure capable of guiding a product to leave and guiding reactant gas to enter, and a passive fuel cell having the electrode structure.

SUMMARY

The present invention provides an electrode structure capable of separately delivering gas and fluid and a passive fuel cell using the same. Since a liquor passage part is treated with hydrophilic treatment and is in cooperation with characteristics of a corner flow formed by a V-shaped groove, fluid can be passively drawn into the passage, and taken away rapidly toward two sides. However, for a gas passage part, in order to separate two phases of gas/liquid, pores of the gas passage are treated with hydrophobic treatment, and droplets can be automatically introduced into the liquor passage part.

Therefore, flows of the two phases of gas/liquid can be effectively separated, and the fluid is rapidly taken away from the reaction zone of the cell.

In view of the foregoing description, the present invention provides an electrode structure capable of separately delivering gas and fluid which is applied to a passive fuel cell. The electrode structure includes an electrode portion and a water removal plate, and the electrode portion is adjacent to the water removal plate. The water removal plate includes a first surface, a second surface opposite to the first surface. A plurality of gas passages pass from the first surface to the second surface. And a plurality of liquor passages are disposed on the first surface. Surfaces of the gas passages are treated with hydrophobic treatment, and surfaces of the liquor passages are treated with hydrophilic treatment.

In an example of the present invention, each of the liquor passages further includes a plurality of grooves, and each of the grooves extends along a longitudinal direction of each of the liquor passages.

The present invention further provides a passive fuel cell including an anode plate, a reaction plate, a cathode plate and a water removal plate which are stacked in sequence. The water removal plate includes a first surface, a second surface opposite to the first surface. A plurality of gas passages pass from the first surface to the second surface. And a plurality of liquor passages are disposed on the first surface. Surfaces of the gas passages are treated with hydrophobic treatment, and surfaces of the liquor passages are treated with hydrophilic treatment.

The technical features and advantages of this disclosure are generally described above, and this disclosure can be better understood through the following detailed description. Other technical features and advantages constituting the subject matters of the claims of this disclosure are described hereinafter. Persons of ordinary skill in the art should understand that, other structures or manufacturing processes can be easily modified or designed based on the concept and the specific embodiments to be disclosed below, so as to achieve the same purpose as that of this disclosure. Persons of ordinary skill in the art should also understand that, such equivalent construction cannot be departed from the spirit and the scope of this disclosure as defined by the appended claims.

BRIEF DESCRIPTION OF THE DRAWINGS

The accompanying drawings, which are incorporated in and constitute a part of this specification, illustrate embodiments of the disclosure and, together with the description, serve to explain the principles of the invention.

FIGS. 5A to 5D are consecutive pictures of fluid flowing on an actual sample of a water removal plate according to the present invention.

DETAILED DESCRIPTION

Figure 1:
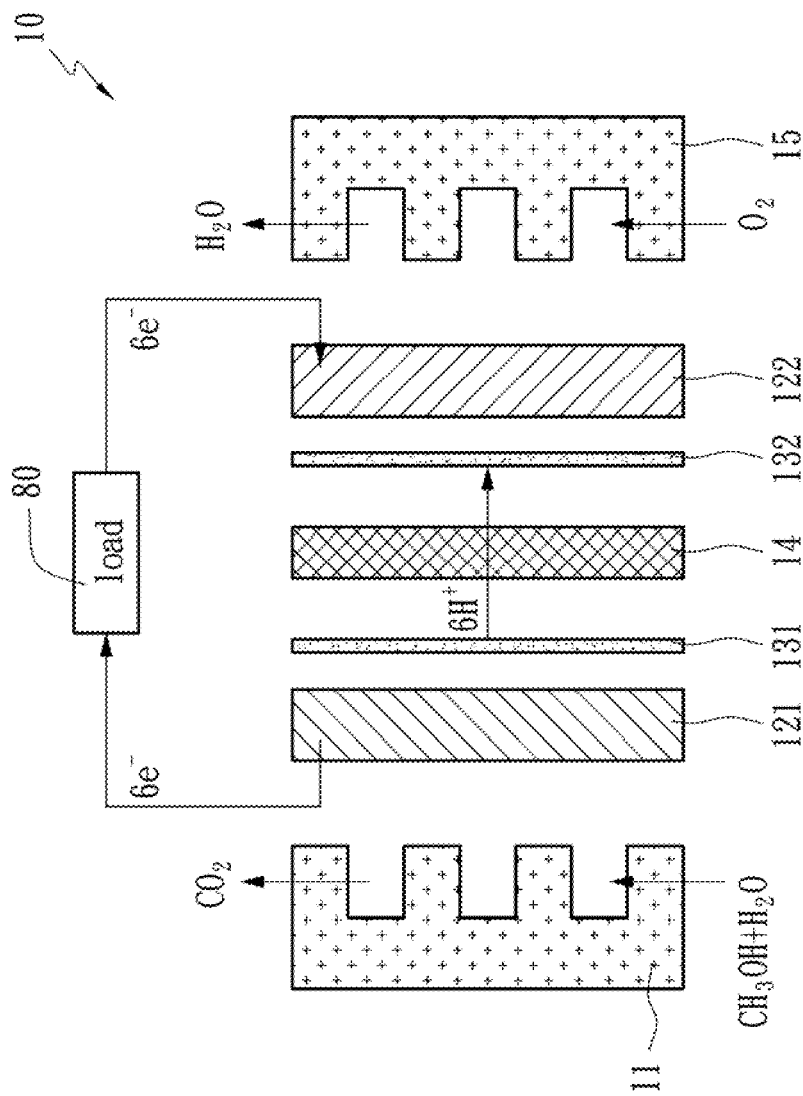
FIG. 1 is a schematic structural view of a conventional DMFC.
Figure 2:
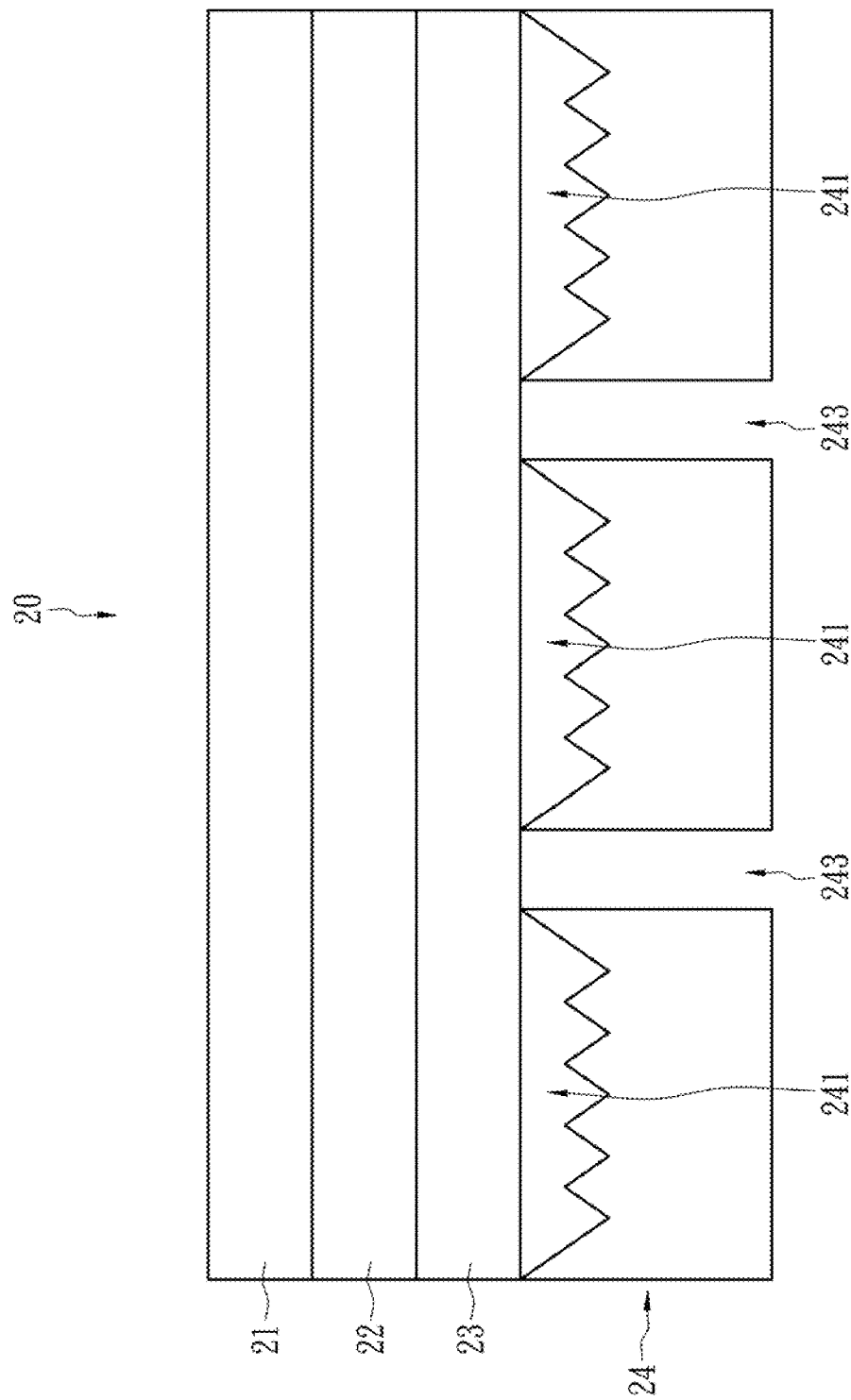
FIG. 2 is a schematic sectional view of a passive fuel cell according to an embodiment of the present invention.

FIG. 2 is a schematic sectional view of a passive fuel cell according to an embodiment of the present invention. The passive fuel cell 20 includes an anode plate 21, a reaction plate 22, a cathode plate 23 and a water removal plate 24 which are stacked in sequence. Also, the reaction plate 22 is located between the anode plate 21 and the cathode plate 23, and is a proton exchange film capable of allowing protons ($H^+$) to penetrate to the cathode plate 23 to perform a reduction reaction. Oxygen needed in the reduction reaction is supplied to the cathode plate 23 through gas passages 243 of the water removal plate 24, and meanwhile waste water generated by the reduction also needs to be drained to the outside through liquor passages 241 of the water removal plate 24. Apparently, the oxygen can enter from bottom to top through the gas passages 243, while the waste water flows in a direction perpendicular to the drawing along the liquor passages 241 and is collected and recycled.

Alternatively, the waste water can be reclaimed and cycled for wetting the proton exchange film (the reaction plate 22), so as to avoid moisture deprivation and loss of function. Also, the waste water can be reclaimed for diluting the methanol solution of the anode plate 21, so that a requirement of an external water storage tank of the passive fuel cell 20 can be saved. In addition, when the passive fuel cell 20 is operated in a high temperature environment, the waste water can be reclaimed for heat dissipation during heat exchange.

Figure 3:
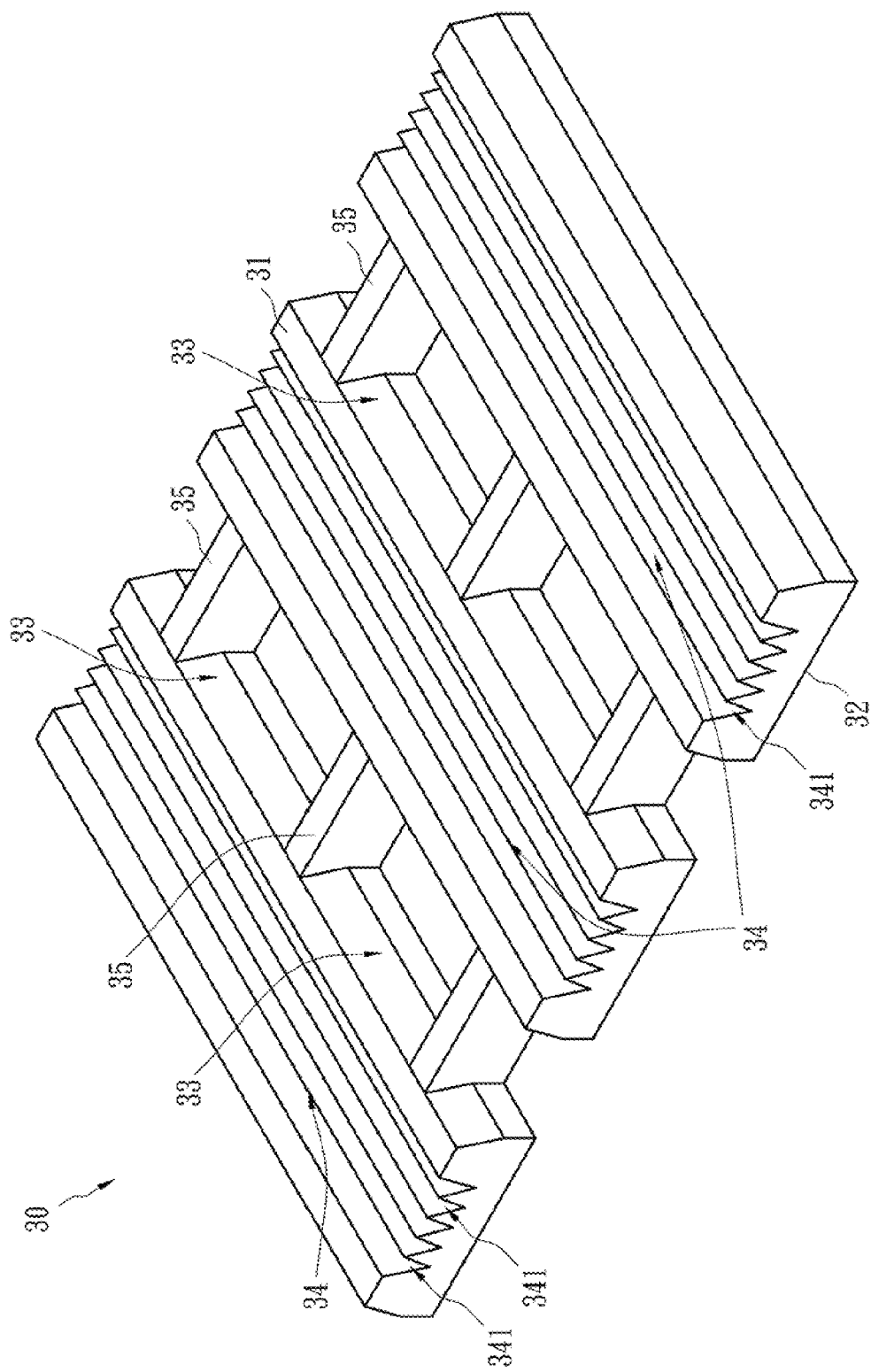
FIG. 3 is a schematic three-dimensional view of a water removal plate according to an embodiment of the present invention.

FIG. 3 is a schematic three-dimensional view of a water removal plate according to an embodiment of the present invention. The water removal plate 30 includes a first surface 31, a second surface 32 opposite to the first surface 31. A plurality of gas passages 33 pass from the first surface 31 to the second surface 32. And a plurality of liquor passages 34 are disposed on the first surface 31. Surfaces of the gas passages 33 are treated with hydrophobic treatment, for example, being covered with a TEFLON layer. Surfaces of the liquor passages 34 are treated with hydrophilic treatment, for example, being treated in a water plasma manner. Each of the liquor passages 34 further includes a plurality of grooves 341, and each of the grooves 341 extends along a flowing direction of each of the liquor passages 34. The gas passages 33 are separated with ribbed plates 35, and each ribbed plate 35 is perpendicularly connected with two adjacent liquor passages 34. A main material of the water removal plate 30 may be thick-film photoresist, such as SU-8.

Figure 4A:
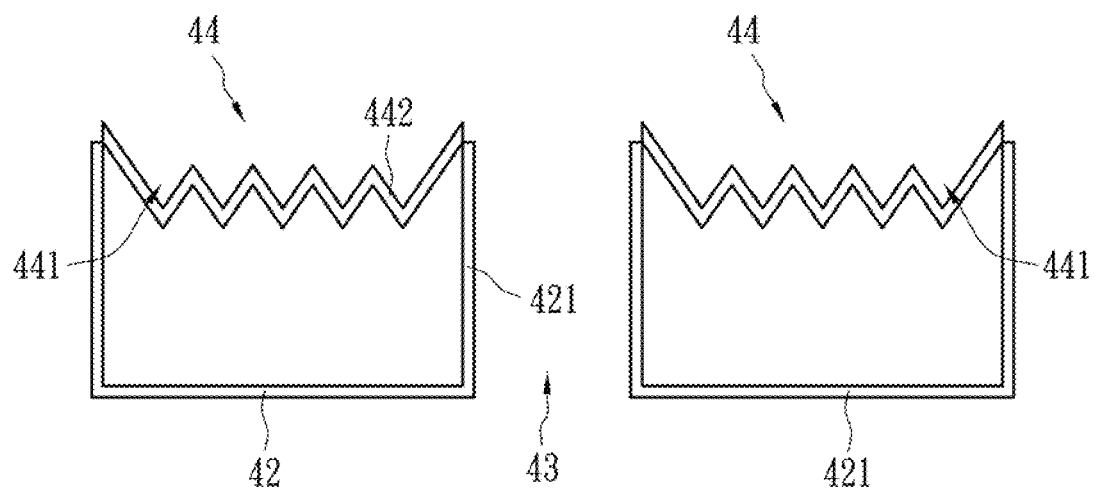
FIGS. 4A and 4B are schematic sectional views of a water removal plate according to an embodiment of the present invention.
Figure 4B:
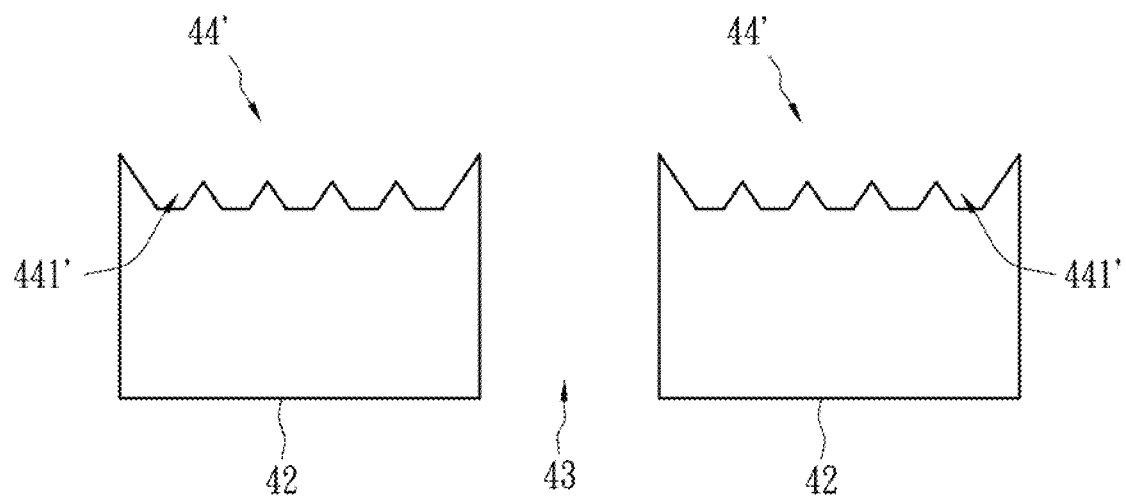

FIGS. 4A and 4B are schematic sectional views of a water removal plate according to an embodiment of the present invention. An inner wall of each gas passage 43 and a second surface 42 are treated with hydrophobic treatment, for example, a hydrophobic material layer 421 composed of a metal film layer of 300 Angstroms (Å) and a Self-assembled Monolayer (SAM) stacked in sequence is formed, in which the SAM may be $C_{18}H_{38}S$ (1-octadecanethiol). Each liquor passage 44 includes a plurality of V-shaped grooves 441, and a surface of each groove 441 is covered with a hydrophilic material layer 442, for example, a silicon dioxide layer. The groove 441 forms a corner flow to enable the waste water to smoothly flow to a fluid collection tank (not shown) at the end of the liquor passage 44.

Compared with FIG. 4A, the grooves 441' of the liquor passages 44' in FIG. 4B are in an inverted trapezoidal shape, and also have the effect of forming the corner flow to enable the waste water to flow.

Figure 5A:
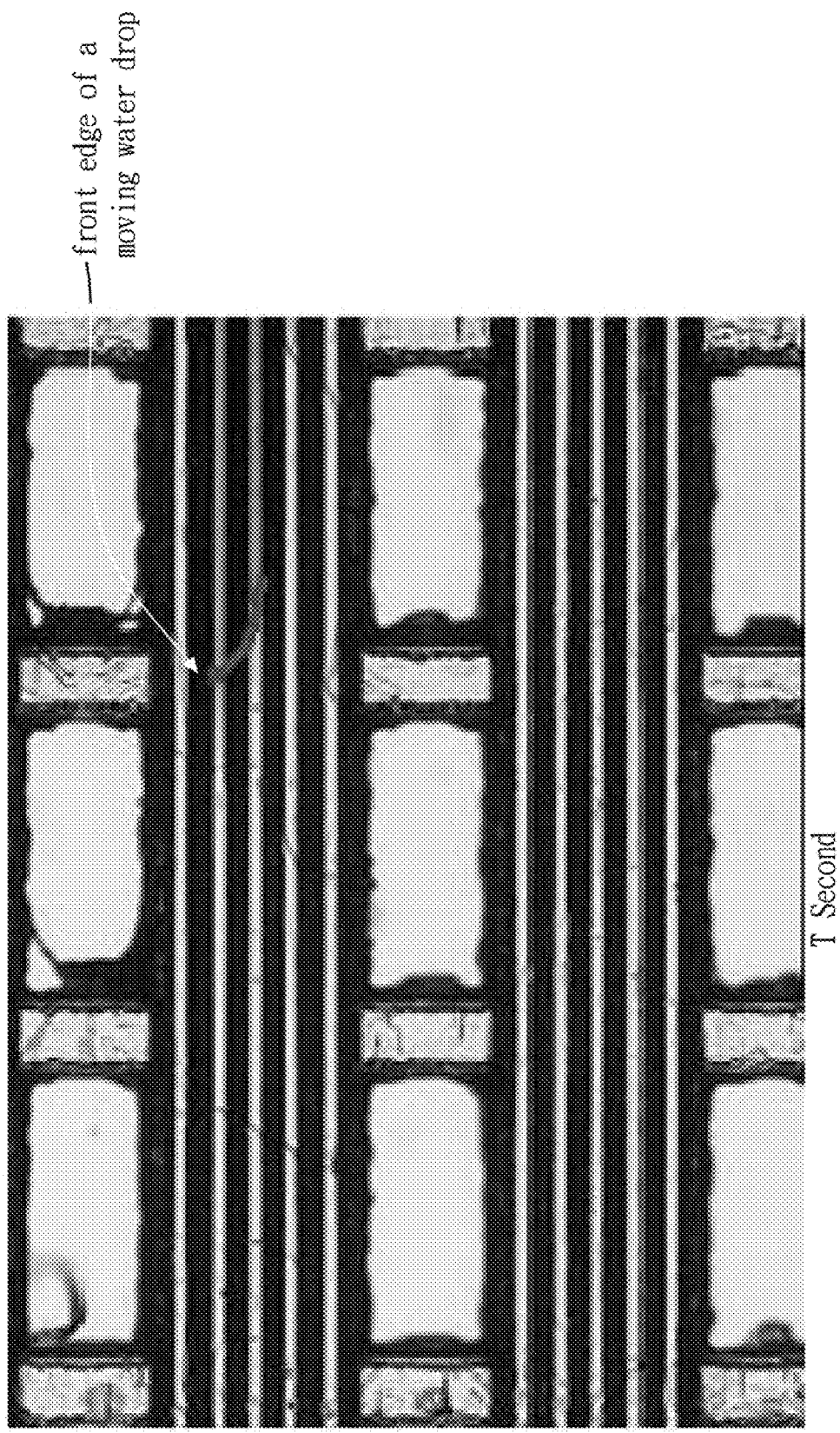
Figure 5B:
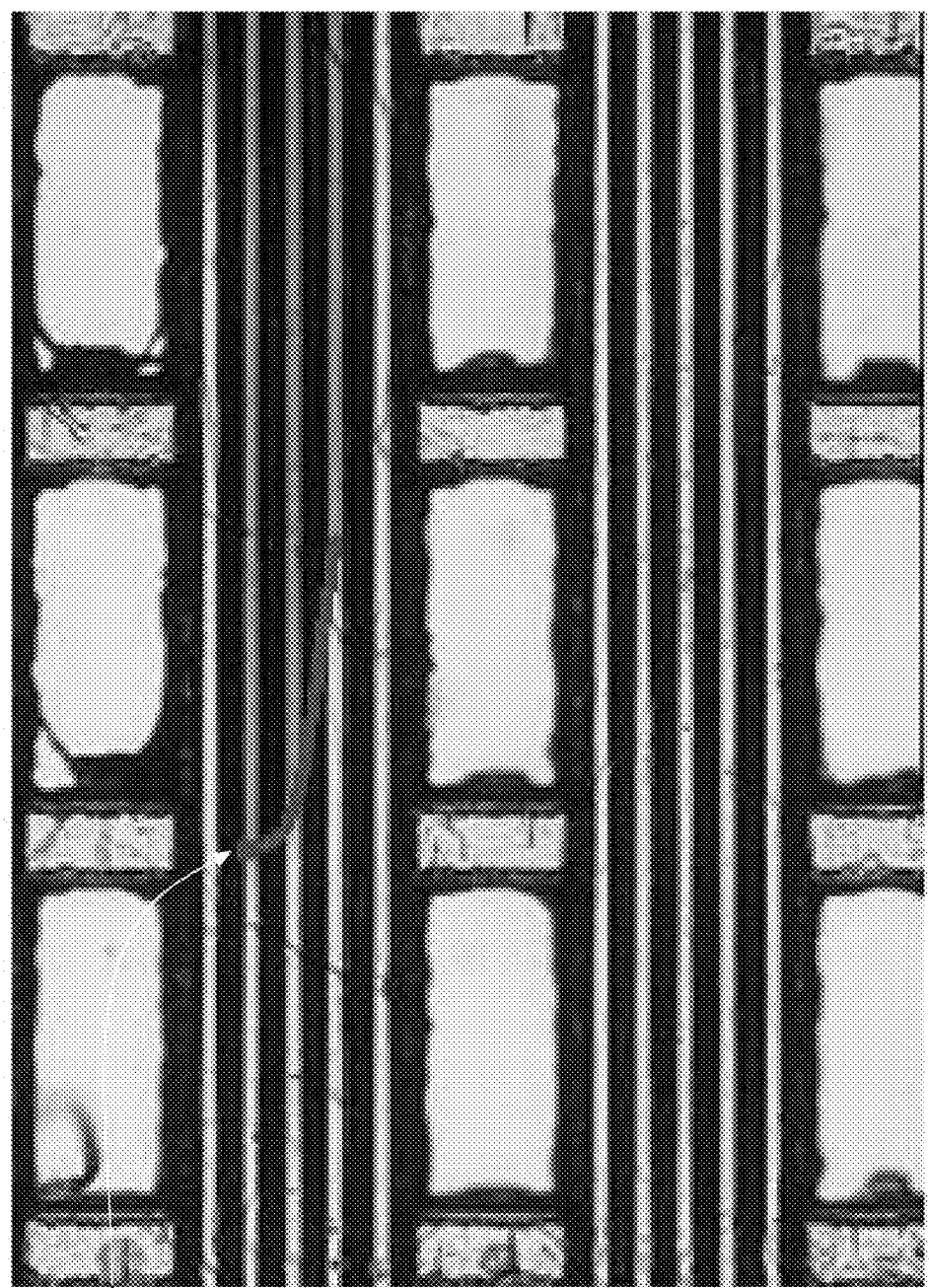
Figure 5C:
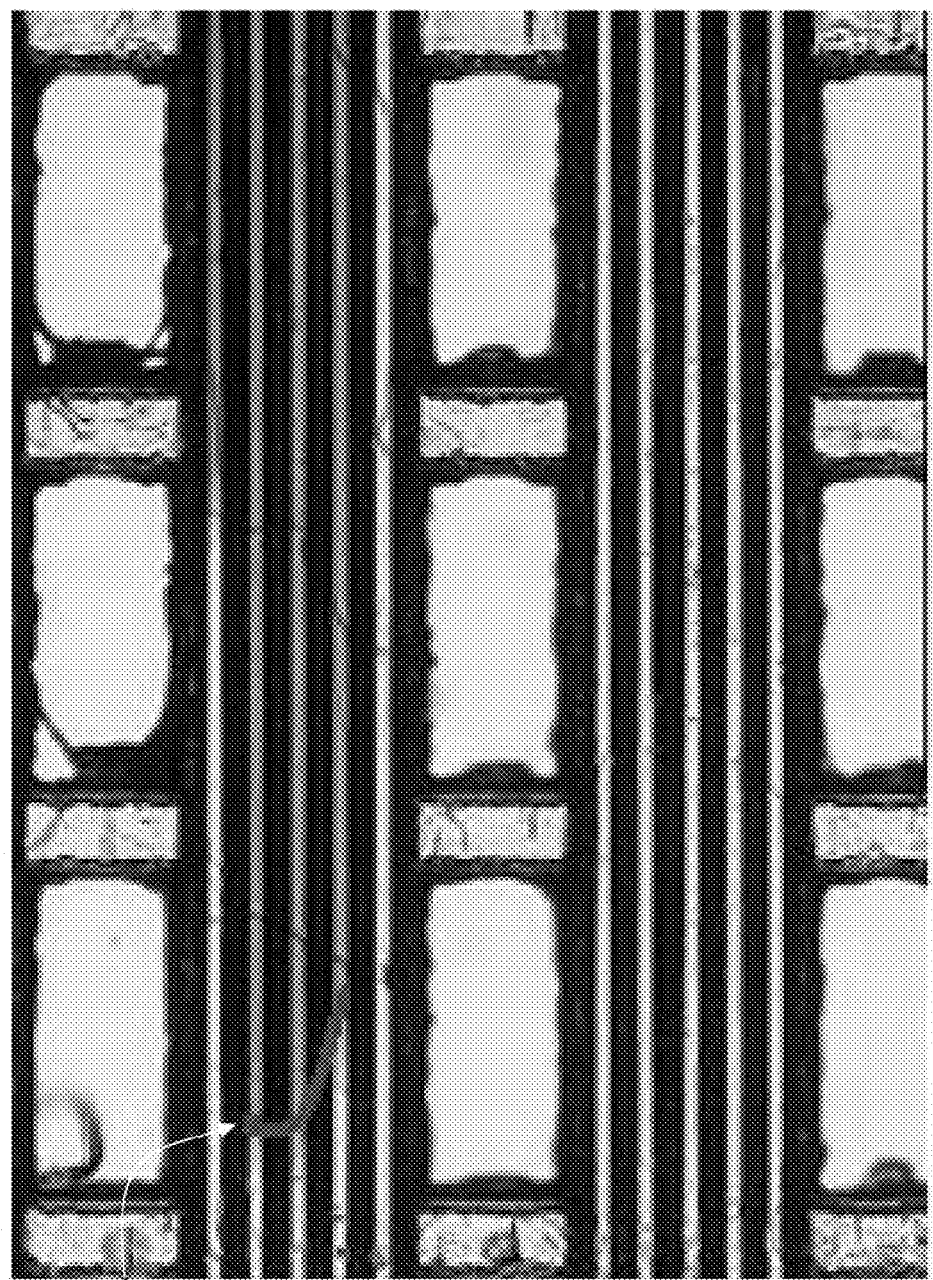

FIGS. 5A to 5D are consecutive pictures of fluid flowing on an actual sample of a water removal plate according to the present invention. The test is performed by dropping 2 µl of blue ink with a micro buret into a liquor passage, and the liquor passage extends along a transversal direction of the picture and includes a plurality of V-shaped grooves. Arc lines in FIGS. 5A to 5C represent a front edge of a moving water drop in the liquor passage, which apparently flows rapidly from right to left, and finally the front edge in FIG. 5D leaves the picture boundary at the left end, the flow velocity of the water drop is 20.42 mm/s, and also the flow of removing the fluid drop is up to 4.65 $\mu ls^{-1}$ $cm^{-2}$. This capability of removing the fluid drop far exceeds the water amount of 0.26 $\mu ls^{-1}$ $cm^{-2}$ generated by the DMFC or the proton exchange film fuel cell under the working performance of 100 mW. 100 mW is a quite desirable power performance for the current micro-DMFC.

Figure 6A:
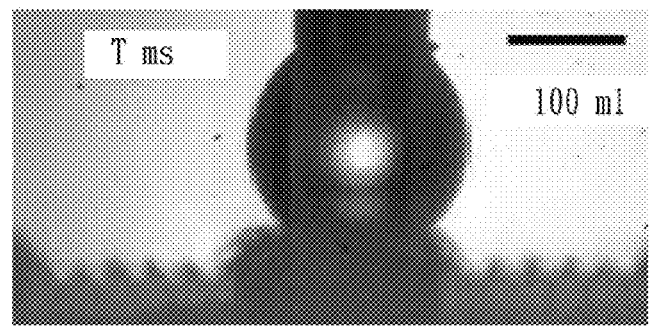
FIGS. 6A to 6P are consecutive pictures of a fluid drop being guided to a liquor passage located at a side edge after dropping on a gas passage.
Figure 6B:
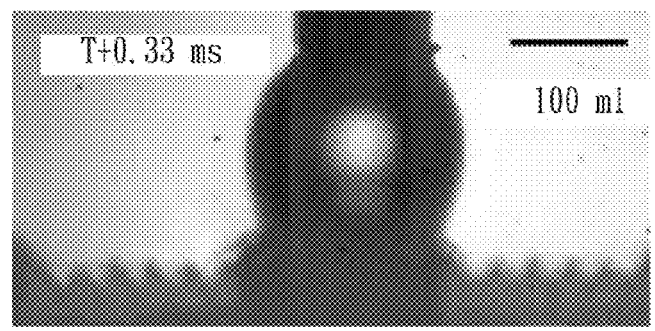
Figure 6C:
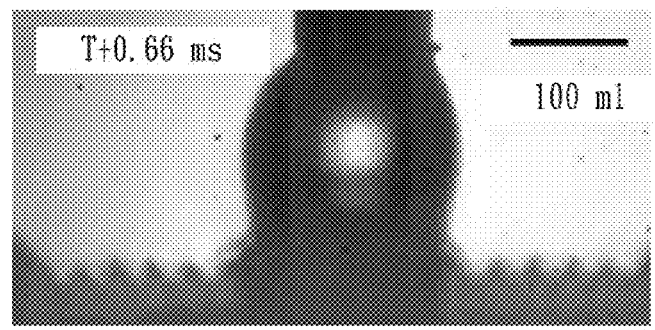
Figure 6D:
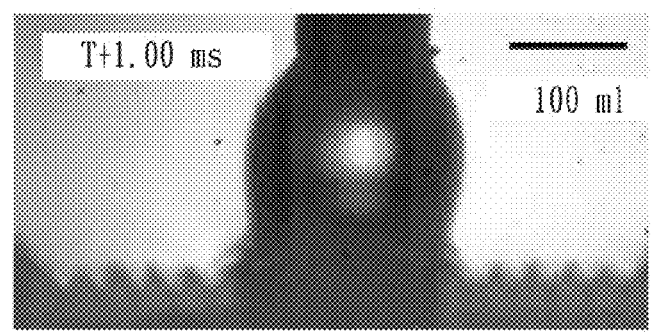
Figure 6E:
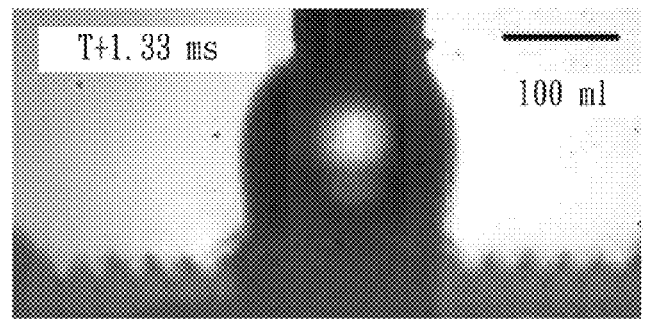
Figure 6F:
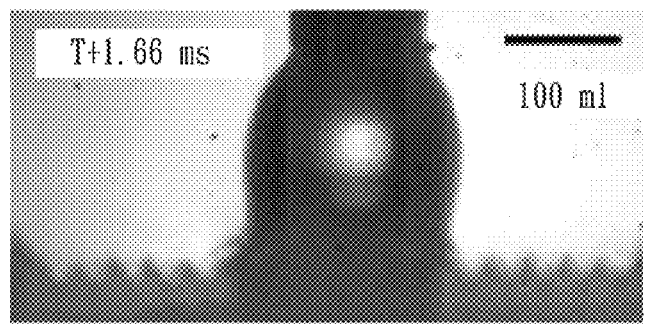
Figure 6G:
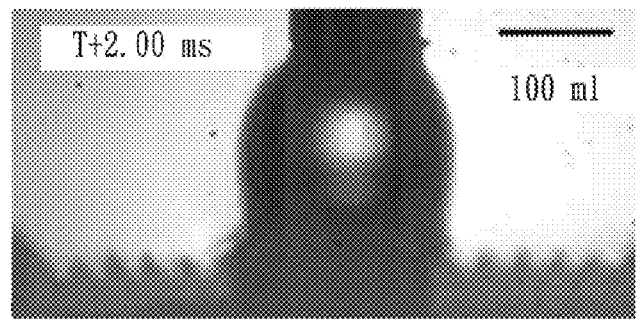
Figure 6H:
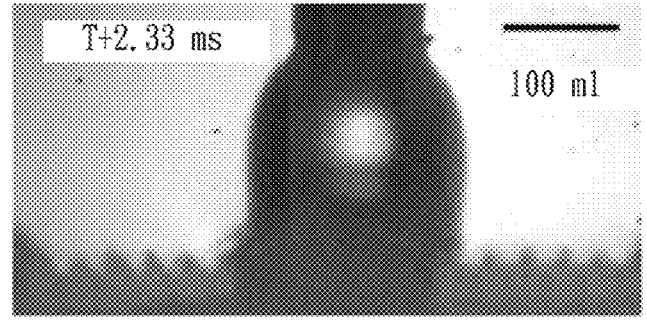
Figure 6I:
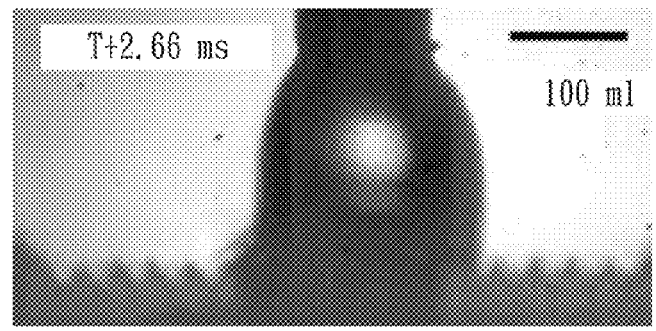
Figure 6J:
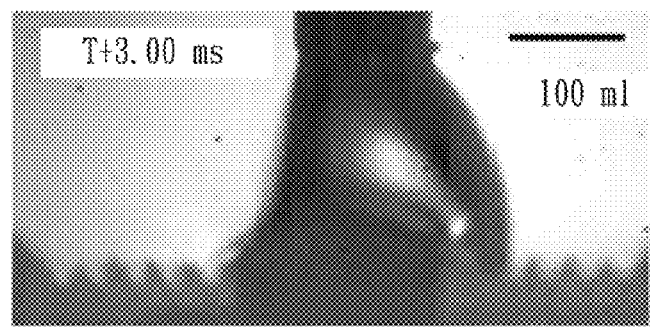
Figure 6K:
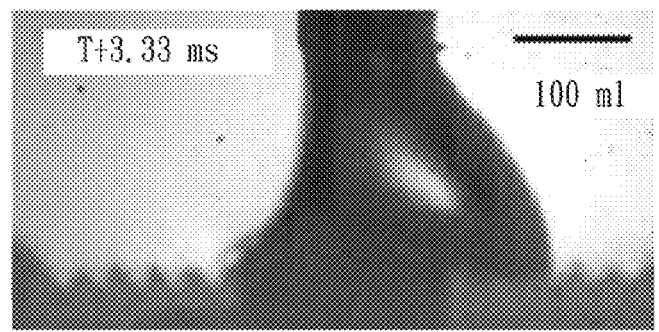
Figure 6L:
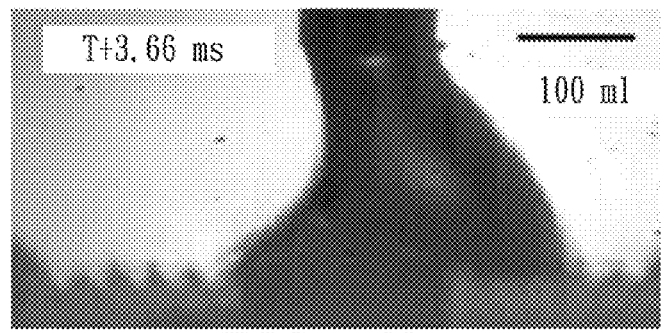
Figure 6M:
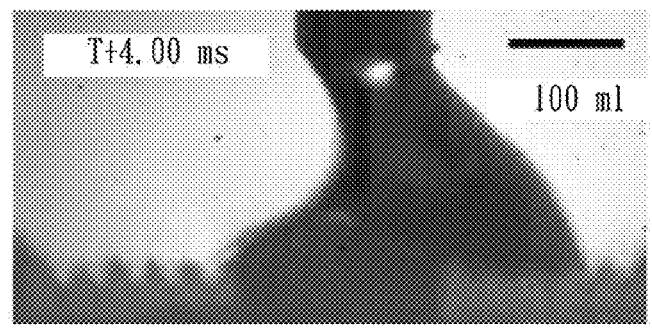
Figure 6N:
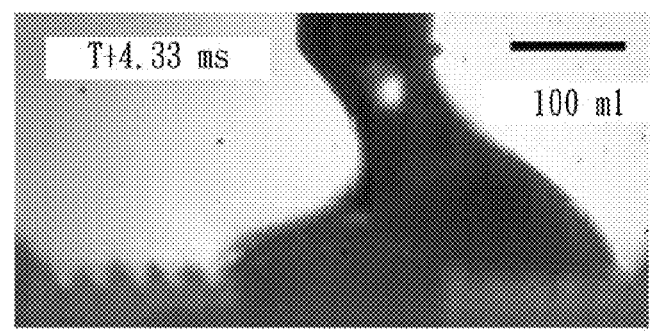
Figure 6O:
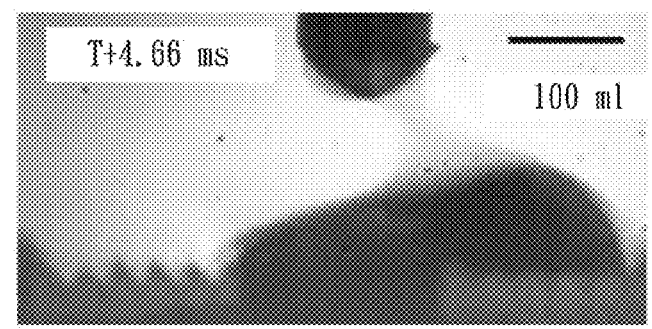
Figure 6P:
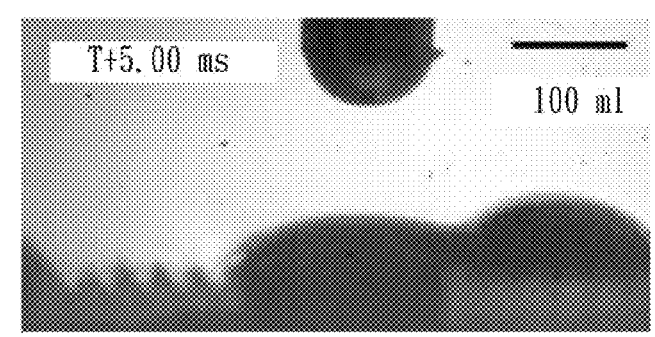

FIGS. 6A to 6P are consecutive pictures of a fluid drop being guided to a liquor passage located at a side edge after dropping on a gas passage. The fluid drop drops on a pore of the gas passage on purpose for observing effects after hydrophilic/hydrophobic treatment, and the speed of outputting water is 0.1 μl/s during the test. It can be seen from the drawings that, although the fluid drop drops on the intermediate gas passage, it still moves toward a direction with a liquor passage located at the side edge (the right side in FIG. 6P), and is drawn into the passage. Therefore, it can be determined that, the paths of fluid and gas can be separated through the hydrophilic/hydrophobic treatment, and even if the fluid drop falls on the gas passage, it may not enter to block the passage.

The technical contents and features of this disclosure are described above, but persons skilled in the art can still make various replacements and modifications without departing from the spirit of this disclosure based on the teaching and description of this disclosure. Therefore, the protection scope of this disclosure is not limited to the embodiments, and shall cover the replacements and modifications made within the scope of this disclosure as defined by the appended claims.

What is claimed is:

1. An electrode structure capable of separately delivering gas and fluid, comprising:
   an electrode portion; and
   a water removal plate adjacent to the electrode portion, comprising a first surface, a second surface opposite to the first surface, a plurality of gas passages passing from the first surface to the second surface, and a plurality of liquid passages recessed from the first surface;
   wherein surfaces of the gas passages are treated with hydrophobic treatment, and surfaces of the liquid passages are treated with hydrophilic treatment;
   wherein each of the liquid passages further comprises a plurality of grooves, and each of the grooves extends along a longitudinal direction of a corresponding one of the liquid passages;
   wherein each liquid passage is defined by two straight side walls connecting to the first surface and the corresponding plurality of grooves, and each side wall defines an adjacent one of the corresponding plurality of grooves.

2. The electrode structure capable of separately delivering gas and fluid according to claim 1, wherein the groove is a V-shaped groove or an inverted trapezoidal groove.

3. The electrode structure capable of separately delivering gas and fluid according to claim 1, wherein the surfaces of the plurality of gas passages are further covered with a hydrophobic material layer.

4. The electrode structure capable of separately delivering gas and fluid according to claim 3, wherein the hydrophobic material layer is a stacked layer formed of a metal film layer and a Self-assembled Monolayer (SAM).

5. The electrode structure capable of separately delivering gas and fluid according to claim 1, wherein the surfaces of the liquid passages are further covered with a hydrophilic material layer.

6. The electrode structure capable of separately delivering gas and fluid according to claim 4, wherein the hydrophilic material layer is a silicon dioxide layer.

7. The electrode structure capable of separately delivering gas and fluid according to claim 1, wherein the second surface is also treated with hydrophobic treatment.

8. The electrode structure capable of separately delivering gas and fluid according to claim 1, wherein the first surface of the water removal plate is adjacent to the electrode portion.

9. A passive fuel cell, comprising:
   an anode plate;
   a reaction plate;
   a cathode plate; and
   a water removal plate, wherein the anode plate, the reaction plate, the cathode plate and the water removal plate are stacked in sequence;
   wherein the water removal plate is adjacent to the cathode plate, and comprises a first surface, a second surface opposite to the first surface, a plurality of gas passages passing from the first surface to the second surface, and a plurality of liquid passages recessed from the first surface;
   wherein surfaces of the gas passages are treated with hydrophobic treatment, and surfaces of the liquid passages are treated with hydrophilic treatment;
   wherein each of the liquid passages further comprises a plurality of grooves, and each of the grooves extends along a longitudinal direction of a corresponding one of the liquid passages;
   wherein each liquid passage is defined by two straight side walls connecting to the first surface and the corresponding plurality of grooves, and each side wall defines an adjacent one of the corresponding plurality of grooves.

10. The passive fuel cell according to claim 9, wherein the groove is a V-shaped groove or an inverted trapezoidal groove.

11. The passive fuel cell according to claim 9, wherein the surfaces of the plurality of gas passages are further covered with a hydrophobic material layer.

12. The passive fuel cell according to claim 11, wherein the hydrophobic material layer is a stacked layer formed of a metal film layer and a Self-assembled Monolayer (SAM).

13. The passive fuel cell according to claim 9, wherein the surfaces of the liquid passages are further covered with a hydrophilic material layer.

14. The passive fuel cell according to claim 13, wherein the hydrophilic material layer is a silicon dioxide layer.

15. The passive fuel cell according to claim 9, wherein the second surface is also treated with hydrophobic treatment.

16. The passive fuel cell according to claim 9, wherein the first surface of the water removal plate is adjacent to the cathode plate.

17. The passive fuel cell according to claim 9, wherein the plurality of liquid passages collects water generated by the cathode plate.

18. The passive fuel cell according to claim 9, wherein the water is supplied to the anode plate to dilute fuel, and is used for wetting the reaction plate or heat dissipation of the passive fuel cell.

* * * * *